Sept. 24, 1968  H. G. HICKMAN ETAL  3,402,692
BRAKE AND TURNS-COUNTING MEANS FOR ROTARY INSTRUMENT
Filed Dec. 23, 1966
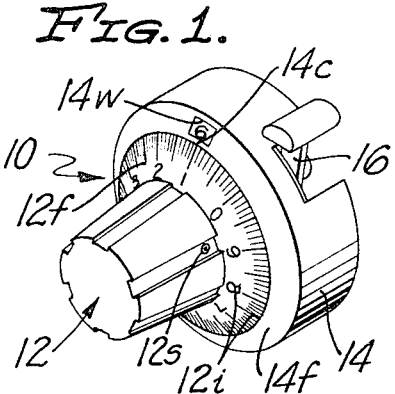
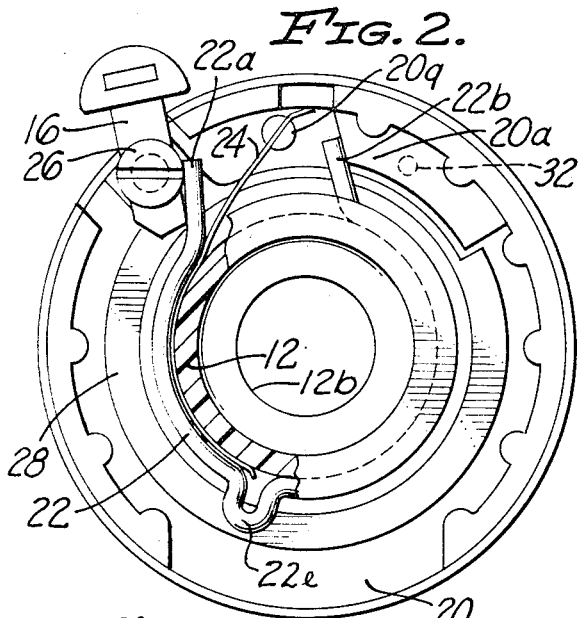
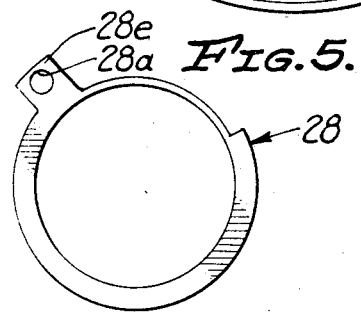
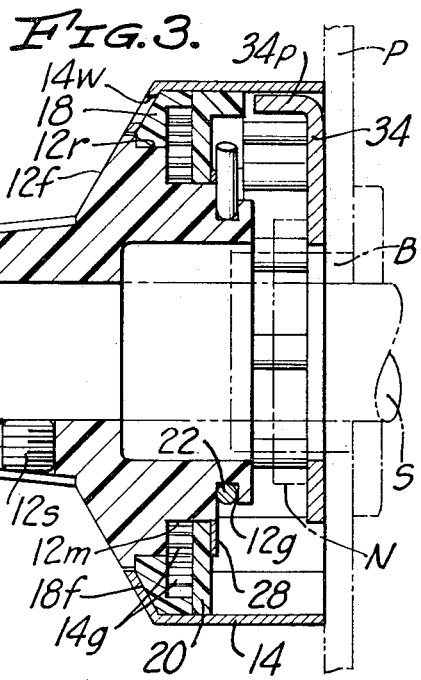
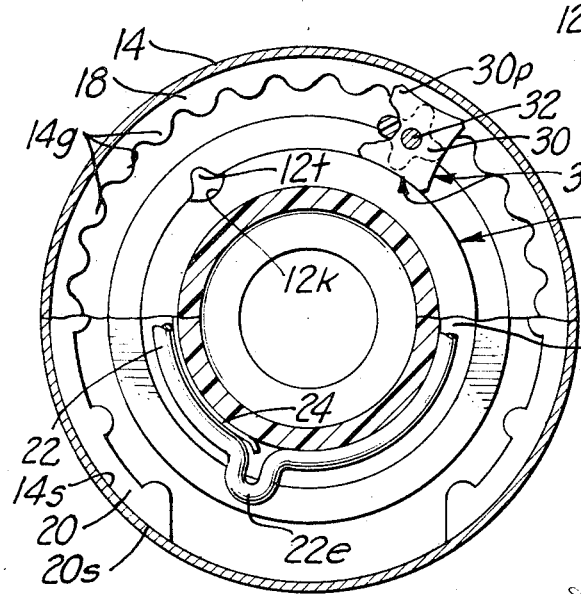
INVENTORS
HAROLD G. HICKMAN,
ROBERT L. JONES,
RICHARD L. BOMAR,
MARVIN E. HARRISON
BY

United States Patent Office 3,402,692
Patented Sept. 24, 1968

3,402,692
BRAKE AND TURNS-COUNTING MEANS FOR ROTARY INSTRUMENT
Harold G. Hickman and Robert L. Jones, Riverside, Richard L. Bomar, Pomona, and Marvin E. Harrison, Riverside, Calif., assignors to Bourns, Inc.
Filed Dec. 23, 1966, Ser. No. 604,273
7 Claims. (Cl. 116—115)

ABSTRACT OF THE DISCLOSURE

A device for attachment to a rotary-instrument operating shaft which shaft may extend from the instrument through a hole in a panel on which the instrument may be mounted, the device having a manually rotatable knob that is secured to the shaft for manual operation of the shaft and for holding the remainder of the device against the front face of the panel, the knob comprising an annular flange provided with indicia to indicate the fractional part of a turn of the shaft from a zero or index position, the device having a stationary body or base, a second annular indicator outwardly of the first and rotatably supported on the knob, jump-gear means on the base operatively interposed between the first and second indicator and effective to step the outer indicator one step for each revolution of the inner indicator and shaft, and brake means including a band riding in an annular groove in the knob adjacent the panel and effective to hold the indicators and base together and operable to clamp the knob against rotation relative to the base.

---

In various types of instruments, notably multi-turn variable resistors and potentiometers, an actuating shaft is connected to operating components whereby adjustments of the latter are effected by rotation of the shaft. In such instruments, it is common that adjustment of the device over the entire operating range requires that the shaft be turned through several or many revolutions. Thus it is desirable that the number of full turns or revolutions of the shaft from an initial or base attitude or position be indicated, and any fractional portion of a revolution as well, whereby the technician or operator may record the setting and at a subsequent time again adjust the instrument to exactly the same setting. Also the turns-indicating means has the desirable attribute of providing at least a close approximation to the extent of adjustment of the instrument. As may be evident, it is often advantageous to lock the shaft in adjusted attitude, whereby the adjustment is not easily accidentally disturbed or altered by vibration or other environmental influences. Quite generally, rotation of the shaft it facilitated by a manually-operable knob or the like which is secured to the shaft. Various combinations and arrangements for the noted purposes are known in the prior art, notably those illustrated in U.S. Patents Nos. Re. 22,277, 1,692,605, 2,509,058, 2,532,970, 2,539,575, 2,558,326, 2,660,904, 2,805,636, 2,901,998, and 2,980,055. Some of the illustrated devices include locking means as well as turns-indicating structures. All of them, however, are characterized by one or more of such undesirable features as expensive construction, large number of parts, parts which wear out quickly, bulky arrangement of components, thus necessitating an unduly large amount of space, complicted or expensive assembly procedures required, and the indication of full turns of rotation being remote from the indication of fractional portion of one turn whereby reading of the indication is unnecessarily difficult.

It is a principal object of the invention to provide a simple, inexpensive and highly effective device for adjusting the adjustment shaft of an instrument such as a multi-turn potentiometer, which device overcomes or obviates all of the noted undesirable features of prior art devices of the class indicated. Another object of the invention is to provide a mechanism adapted to be secured to the adjusting shaft of an instrument to facilitate rotation of the shaft manually while concurrently providing easily read indications of complete and fractional revolutions of the shaft and means for preventing unintentional rotation of the shaft and which mechanism is simple and inexpensive. Other objects and advantages of the invention are hereinafter made evident or set forth in the appended claims and the following description of a preferred physical embodiment of the invention illustrated in the accompanying drawings forming a part of this specification.

In the drawings,

FIGURE 1 is a pictorial view of a preferred exemplary device according to the invention, detached from the operating shaft with which it is adapted to be used, the view being to an arbitrary scale;

FIGURE 2 is a rear view, to a larger scale, of the device depicted in FIGURE 1, with a portion of a member broken away to reveal details;

FIGURE 3 is a longitudinal sectional view of the device illustrated in FIGURE 2, with auxiliary means depicted in dotted-line form;

FIGURE 4 is a view similar to FIGURE 2, with parts broken away to show details of gear means; and FIGURE 5 is a plan view of a shim member.

Referring first to FIGURE 1, the exemplary turns-counting indicator and brake device is denoted generally by ordinal 10. As a principal component, the device includes a knob 12 which is hollow and adapted to be secured to a shaft by means of one or more set screws 12s. The knob is rearwardly enlarged to provide a beveled annular flange having a face 12f upon which are radial graduated marks and appropriate numerical indicia, collectively denoted 12i and hereinafter termed indicia. The device includes an outer shell or case 14, and brake means including a brake lever 16. The case 14 is generally cylindrical in form but has an annular beveled front face formed by an integral flange 14f, in which flange an aperture or window 14w is provided. An index line 14i is applied below the window, as indicated, as a ledger or index for cooperative indicating function with the indicia 12i.

As is shown in FIGURE 3, knob 12 is formed with a bore 12b dimensioned to receive a shaft S (indicated in dotted outline) and with a tapped transverse bore to accommodate the set screw 12s. The shaft bore 12b is stepped and of larger diameter at the rear of the knob, to provide clearance for bushing and nut means by means of which the instrument may be secured to a panel and in which bushing the shaft S is journaled. The flange portion of the knob, rearwardly of face 12f, is stepped to provide a cylindrical bearing surface 12r upon which an annular second indicator member 18 is rotatably supported. The second indicator member has a beveled annular front face 18f upon which is provided, as by embossing or printing, a series of indicia in the form of numerals such as the numeral 6 apparent in window 14w in FIGURE 1, the indicia being dimensioned and arranged to be moved one by one into position facing the window. The second indicator is formed to include a circular series of internal gear teeth 14g (FIGURE 4) which provide an internally toothed ring gear. Disposed around a second annular step 12m (FIGURE 3) formed on the rearward extension of knob 12, and in cooperative engagement therewith immediately to the rear of second indicator 18, is a generally ring-shaped stationary member 20 herein for convenience termed a frame. As is indicated in FIGURES 3 and 4, frame 20 has a circular exterior surface 20s which closely fits the encircling inner surface 14s of shell 14, whereby the shell and frame fit tightly together as a unit.

Further, as revealed in FIGURE 4, the rear-end portion of knob 12 is provided with an annular groove 12g radially inwardly and to the rear of step 12m. Groove 12g is arranged for reception of arcuate portions of a generally U-shaped spring wire retainer-brake member 22 (FIGURE 2), and a depending portion of a resilient curved shoe 24 of flat rectangular cross section. Member 22 is provided with an intermediate bight or reverse bend 22e (FIGURE 4), and outstanding ends 22a and 22b. The inner surfaces of the arcuate portions of member 22 are such that when the member is relaxed they do not tightly or closely engage the knob at the bottom of the groove, but such that when ends 22a, 22b are brought closer either to the other, the arcuate sections may closely embrace the complementary surface of the knob and frictionally resist rotation of the knob. For that purpose, end 22b is shaped to repose against a shoulder or abutment 20a (FIGURE 2) formed on frame 20, and end 22a is disposed to be moved toward end 22b by action of brake lever 16. The brake lever is mounted for pivotal or rocking movement on a pivot screw 26 which is turned into a tapped hole provided in frame 20; and thus when rotated counter-clockwise as viewed in FIGURE 2, lever 16 by cam action moves end 22a toward end 22b to effect the clasping or gripping action noted. Clockwise movement of lever 16 permits expansion of spring member 22 to more relaxed attitude to release the brake.

To obviate possible slight rotation of the knob as spring member 22 is contracted by lever 16, and to improve the frictional engagement of the brake means with the knob, the slender arcuate resilient shoe 24 (FIGURE 2) is interposed between one limb of member 22 and the cylindrical surface at the bottom of groove 12g of the knob. Shoe 24 is retained captive in position by having the outer (upper) end retrained in a transverse slot formed in an outstanding stud 20q which extends rearwardly from the rear face of frame 20. The other (lower) end of shoe 24 is preferably slightly curved to facilitate rotation of the knob when the brake or lock is released, with the curved end disposed within bight 22e as indicated in FIGURES 2 and 4. Thus as lever 16 is rotated from brake-off to brake-on position and end 22a of member 22 is moved toward end 22b, the slight tendency for the spring to induce rotation of the knob as the embrace tightens is effectively eliminated by shoe 24.

The retaining function performed by the spring 22 is accomplished by the bight 22e and ends 22a and 22b holding in place, forwardly thereof, a shaped ring or shim 28 (FIGURE 5) whose inner circular surface fits the step 12m of knob 12 just forwardly of the spring. The relationship of the noted components is made evident in FIGURE 3. Shim 28 (FIGURE 5) is provided with an ear 28e which has an aperture 28a therethrough and which aperture accommodates the shank of brake lever pivot screw 26 in a manner made evident in FIGURE 2. Thus, as is evident from consideration of the upper part of FIGURE 3, spring 22 prevents movement of shim 28 off step 12m of knob 12, and cooperatively with the shim, holds knob 12 from moving forwardly out of the circular hole in frame 20 (or movement of frame 20 off step 12m), and outer (second) indicator 18 is held captive between frame 20 and the annular outer flange of knob 12 adjacent indicia 12i. Thus the outer indicator 18, frame 20, and shim 28 are held on knob 12 by brake spring 22, and, since outer shell or case 14 is press-fitted onto frame 20, the previously described components form a coherent device irrespective of whether or not the knob is on a shaft.

To cause stepwise rotation of outer (second) indicator 18 one step each complete revolution of inner (first) indicator 12f, the knob is provided with a single gear tooth 12t (FIGURE 4) on step 12m radially inwardly of the teeth of gear teeth 14g of the outer indicator, and there is interposed between the two a four-tooth step gear 30 (FIGURE 4) which is mounted for rotation on a pin 32 fixed in frame 20. The teeth of step gear 30 engage the teeth 14g of the second indicator, and are engaged in succession by the single tooth 12t of the first indicator as the latter executes successive full revolutions or turns. To prevent undesired rotation of the step gear and second indicator between engagements by tooth 12t, the step gear is provided with a block-like extension providing four arcuate surfaces such as 30s which closely conform to the surface of step 12m, the arcuate surfaces being terminated by intervening points such as 30p. The step 12m is interrupted, next adjacent to tooth 12t, by a recess 12k (FIGURE 4), whereby points 30p of step gear 30 are permitted to rotate when tooth 12t engages a tooth of the step gear. The recess 12k is shaped to freely pass either of the points 30p in either direction of rotation of the step gear.

It is evident from the preceding description that the turns-indicating or counting and brake means or device, assembled as indicated, is a coherent unitary mechanism capable of being handled without derangement of parts and capable of being applied to the operating shaft of an instrument such as a multi-turn potentiometer with ease. In those instances where it is desirable to insure against accidental rotation of the frame and shell 14 about the shaft, an anti-rotation washer such as 34 (FIGURE 3) having a projection 34p may be used with the instrument. The washer is clamped to the panel (P) by the nut (N) which is turned onto the bushing (B) of the instrument, as is conventional with many kinds of instruments such as potentiometers. The washer projection 34p is designed to fit in a recess or hole provided in the rear face of the frame 20, as indicated in FIGURE 3. It is also evident that the shell 14 is not essential to operability of the device but is of value in improving appearance of the operating structure, in excluding foreign material from the gearing, and in restricting the visible portion of the second indicator to the single number representing the presently effective number of full turns the knob and shaft have been rotated from a zero or base position. Having been used to adjust the instrument via rotation of the shaft, lever 16 is rotated to force limb or end 22a of spring 22 toward end 22b to lock the shaft against unintended rotation, the lower end of the lever having a beveled end surface that comes into confronting contact with a portion of end 22a to effect locking action. Thereafter, the lever may be forcibly rotated clockwise as viewed in FIGURE 2, to unlock the brake and permit re-adjustment of the shaft as may be desired. The locking action, and the unlocking action, are made evident by FIGURE 2, and the fact that the lever does not interfere with visual examination of the indicators nor with operation of the knob when the brake is released, is made evident in FIGURE 1.

Also made evident in the preceding description is the fact that the device provides an exceptionally simple and inexpensive but very effective unitary device for the intended purpose and function, and that the device fully anticipates the noted objects. In the light of the disclosure of the preferred form of the invention, changes will occur to others; and accordingly it is not desired that the invention be restricted to details of the preferred illustrated form of the device except as is required by the appended claims.

We claim:

1. An instrument shaft-actuating and turns-indicating device adapted to be secured to the rotary adjustment shaft of an instrument for actuation thereof and for releasably locking the same in a selected position indicated by the device, said device comprising:

first means, includingg a manually operable member having means defining for said member an axis of rotation extending forwardly and rearwardly thereof and having a knob portion at the forward end thereof and an annular indicator dial portion rearwardly of the knob portion carrying thereon a circular series of indicia providing a primary annular indicator and said member having a stepped portion extending rearwardly of said dial portion and having annular steps and an annular groove rearwardly of said steps;

second means, including stationary frame means having a bearing surface complementary to and in bearing relationship with one of the steps of said stepped portion of said operable member, and said second means providing an index mark for said indicia on said indicator dial;

third means, including a resilient wire spring means having spaced-apart portions disposed in respective portions of said annular groove and a first end portion extending out of said groove and another portion engaging said second means to restrain said spring means from rotation with said operable member, said third means serving to retain said manually operable member in said bearing relationship with said frame means, and said spring means tending to expand radially of said operable member out of frictional engagement with the latter at the bottom of said groove; and fourth means, including lever means mounted on said second means in juxtaposition to said first end of said spring means and operable to and from first and second positions to move said third means into tight clamping and releasing relationships, respectively, with said operable member;

whereby upon movement of said lever means to said second position said operable member may be easily manually rotated relative to said frame means to set a desired area of said indicator dial into juxtaposition with said index mark and thereafter upon movement of said lever means to said first position said operable member is frictionally locked by said third means against rotation relative to said frame means, said third means serving to retain said first means in operative rotary relationship to said second means.

2. A device according to claim 1, including:

fifth means, said fifth means comprising a secondary annular indicator rotatably disposed upon a step of said operable member and carrying indicia rotatable into juxtaposed relationship with said index mark, said fifth means further comprising rotatable means interposed between said operable member and said secondary annular indicator in driving relationship with the latter and arranged to be engaged and stepwise rotated by said operable member once each revolution of said member to stepwise rotate said secondary annular indicator;

whereby during rotation of said operable member relative to said second means said indicator dial provides a visible indication of fractional portions of each revolution through which said member is rotated relative to said index mark and said secondary annular indicator provides a visible indication of the number of full revolutions through which said member is rotated from a determined position, and whereby following adjustment of said member to a desired relationship relative to said frame means and index mark said lever means is operable to cause said third means to lock said member in said desired relationship.

3. A device according to claim 2, said third means including a flat elongate member disposed in part in said groove between one of said spaced-apart portions of said wire spring means and said operable member at the bottom of the said groove, and said flat elongate member having an end portion anchored to said frame means and being arranged to be pressed into frictional engagement with said operable member at the bottom of said annular groove incident to contraction of said wire spring means and permitting easy relative rotation of said operable member relative to said frame means incident to expansion of said wire spring means.

4. A device according to claim 3, in which said rotatable means interposed between said operable member and said secondary annular indicator comprises a pinion gear the teeth of which engage gear teeth provided on said secondary annular indicator and which are engaged one at a time by a gear tooth provided on said first means, and pivot means borne by said frame means, said pinion gear being mounted on said pivot means.

5. An actuating and indicating device for an adjustable instrument having a shaft rotatable through a defined number of revolutions in effecting the full range of adjustment thereof, said device being unitary and coherent and adapted to be secured on such shaft, said device comprising:

a first component, having a manually manipulatable forwardly extending knob portion and an annular beveled flange carrying indicia forming a first rotary indicator and said component having rearwardly of said component having rearwardly of said flange a set of generally cylindrical step portions of successively decreasing diameters and an annular groove rearwardly of said stepped portions;

a second component comprising a second rotary indicator of generally annular form mounted on a forward one of said step portions of said first component for rotation thereon, said indicator having a forward face carrying an annular set of indicia;

a third component, comprising a stationary generally circular frame having an opening therethrough from front to rear and providing a bearing portion seating on one of said steps of said first component;

a fourth component, comprising a resilient spring engaged in at least portions of said groove and having outwardly extending portions disposed rearwardly of said bearing portion of said frame and effective to restrain movement of the grooved portion of said first component through said opening in said frame, whereby said first and third components are held together with said second component captive therebetween; and a fifth component, including step driving means mounted on said frame in driving engagement with said second component and engaged by said first component once each revolution of the latter to thereby step said second rotary indicator one step per revolution of said knob portion;

whereby said second rotary indicator indicates the number of complete revolutions of said knob portion from an initial base position and said first rotary indicator provides an indication of fractional portions of a complete revolution of said knob portion relative to said frame.

6. A device according to claim 5, in which said spring engaged in said groove in said first component has a first outwardly-extending end disposed against a portion of said frame and held thereby against movement in a direction tending to expand the spring, and in which said spring by internal strain tends to expand away from the bottom of said groove, and said device including as a sixth component manually-operable lever means movable to and from first and second positions in a first of which a second end of said spring is engaged thereby and forced toward said first end whereby said spring is contracted and grips said first component and restrains rotary motion of said first component relative to said frame and in a second of which positions said lever means permits said spring to expand outwardly from the bottom of said groove to release said first component, whereby following adjustment rotation of said knob a desired extent as indicated by said first and second indicators said lever may be moved to lock said knob against unintended rotation to preserve the adjustment and whereby thereafter said lever means may be moved to unlock said knob for intended manual readjustment.

7. An instrument shaft-actuating and locking device comprising:
- first means, including a manually-rotatable member arranged and adapted to be secured to a shaft for manual rotation of the latter, and means to secure the said member to such a shaft, the said member having a knob-like forward end and a circular rearward end;
- second means, including stationary frame means having bearing portions engaging the said member and having supporting relationship thereto;
- third means, including a resilient spring device having opposed generally arcuate portions dimensioned and arranged for contractile movement of one of said portions toward another thereof and toward tight clasping frictional engagement with said rearward end of said rotatable member and for expansile movement of said one portion away from the said other and away from frictional engagement with said rearward end of said rotatable member;
- fourth means, including movable means for effecting contractile movement of said spring device toward engagement with said rotatable member while concurrently stressing said spring device; and
- fifth means, including a resilient shoe member interposed between said rotatable member and said one of said portions of said spring device;
- whereby contractile movement of said spring device and said shoe into tight frictional engagement with said rotatable member is effected by said movable means without causing incremental rotation of said rotatable member.

References Cited
UNITED STATES PATENTS

| | | | |
|---|---|---|---|
| 2,539,575 | 1/1951 | George | 116—133 |
| 2,805,636 | 9/1957 | Smith | 116—115 |
| 2,901,998 | 9/1959 | Keith | 116—115 |
| 2,979,258 | 4/1961 | Van Alen | 235—103 |
| 2,980,055 | 4/1961 | Burns | 116—115 |
| 3,031,035 | 4/1962 | Tomita | 188—71 |
| 3,183,885 | 5/1965 | Venema | 116—124 |
| 3,202,127 | 8/1965 | Struble et al. | 116—115 |

LOUIS J. COPOZI, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,692                                                    September 24, 1968

Harold G. Hickman et al.

It is certified that error appears in the above identified patent and that said Letters Patent are hereby corrected as shown below:

Column 1, line 53, "it" should read -- is --. Column 3, line 40, "retrained" should read -- retained --. Column 4, line 73, "includingg" should read -- including --. Column 6, line 21, cancel "component having rearwardly of said".

Signed and sealed this 10th day of February 1970.

(SEAL)
Attest:

Edward M. Fletcher, Jr.                          WILLIAM E. SCHUYLER, JR.
Attesting Officer                                        Commissioner of Patents